United States Patent
Gabard (12) 
(10) Patent No.: US 6,805,205 B1
(45) Date of Patent: Oct. 19, 2004

(54) DEVICE AND METHOD FOR TREATING THE SOIL BY AERATION

(76) Inventor: Noël Gabard, 60 rue du 19 Janvier, 92380 Garches (FR)

( * ) Notice: Subject to any disclaimer, the term of this patent is extended or adjusted under 35 U.S.C. 154(b) by 0 days.

(21) Appl. No.: 10/018,183

(22) PCT Filed: Jun. 16, 2000

(86) PCT No.: PCT/FR00/01678

§ 371 (c)(1),
(2), (4) Date: Dec. 18, 2001

(87) PCT Pub. No.: WO00/78122

PCT Pub. Date: Dec. 28, 2000

(30) Foreign Application Priority Data

Jun. 18, 1999 (FR) ............................................. 99 07782
Jan. 18, 2000 (FR) ............................................. 00 00608

(51) Int. Cl.[7] .......................... A01B 45/00; A01B 45/02
(52) U.S. Cl. ........................................ 172/22; 172/21
(58) Field of Search ..................................... 172/21, 22

(56) References Cited

U.S. PATENT DOCUMENTS

| | | | |
|---|---|---|---|
| 2,088,209 A | | 7/1937 | Nolte |
| 2,127,510 A | | 8/1938 | Fulton |
| 2,580,236 A | | 12/1951 | Mascaro |
| 3,797,578 A | * | 3/1974 | Velasquez .................... 172/22 |
| 3,868,063 A | * | 2/1975 | Slaker ................. 241/101.763 |
| 4,148,362 A | * | 4/1979 | Orth ............................. 172/22 |
| 5,069,293 A | * | 12/1991 | St. Romain ................... 172/22 |
| 5,178,221 A | | 1/1993 | Hamawaki et al. |
| 5,423,386 A | * | 6/1995 | Lapearous .................... 172/22 |
| 5,816,336 A | * | 10/1998 | Underhill ..................... 172/22 |

FOREIGN PATENT DOCUMENTS

GB        461512        2/1937

* cited by examiner

*Primary Examiner*—Robert J. Sandy
*Assistant Examiner*—Katherine W Mitchell
(74) *Attorney, Agent, or Firm*—Young & Thompson (57) ABSTRACT

A device (1,1') for treating the soil by aeration includes a frame (10,10') and tools (11, 12, 11', 12') which are moveable and which perform core boring in the ground for aeration purposes, whereby the cores (8) are ejected from the tools, the device being able to be displaced and raised, characterized in that a receiving member (2, 3, 101) for the cores, having through openings (23) for the tools and integral with the frame, is disposed between the soil and the ejection area of the cores so that the ejected cores are stored therein (8'). The receiving member includes a flexible belt (2) which includes raised elements and/or elements in series of chevrons (25) enabling the core holes (7) to be filled with sand. The receiving member can be modular in a transversal and/or longitudinal direction and the modules (102, 103, 104, 108, 109) are hinged to each other (106,107). Sand which accumulates at the rear of the device can be brushed afterwards.

24 Claims, 10 Drawing Sheets

DEVICE AND METHOD FOR TREATING THE SOIL BY AERATION

CROSS REFERENCE TO RELATED APPLICATION

This is the 35 USC 371 national stage of international application PCT/FR00/01678 filed on Jun. 16, 2000, which designated the United States of America.

FIELD OF THE INVENTION

This invention relates to a device and a method for treating the soil by aeration with waste storage. It finds application in the treatment of soils within the framework of their aeration or decompaction and more especially sports facilities or lawns.

BACKGROUND OF THE INVENTION

In order to ensure good development of herbaceous plants on meadows or maintained lawns and, for example, on golf links, it is advisable to proceed regularly to aeration or decompaction of the soil. To this end, one uses vehicles that are generally towed and/or motorised with a great number of hollow needles, called hollow narrow spades. The hollow narrow spades are mobile and are alternately and regularly inserted in the soil, as the vehicle moves. A holding down clamp can be provided between the hollow narrow spades. The narrow spades can be inserted by an essentially vertical motion, generally caused by the transformation of a rotational movement into a translation movement. The narrow spades can also be inserted by simple rotation, on the soil, of a ballasted wheel carrying the said spades. In the latter case, the narrow spades are bent in relation to the diameter of the wheel in order to avoid a lever movement detrimental to the soil. Apart from soil treatment operations, these devices are generally raised to enable their displacement without the narrow spades contacting the soil. The hollow narrow spades enable to extract cores from the soil, cores consisting of earth and vegetables and corresponding roots. The core formed previously in a hollow narrow spade is ejected during the next core boring, whereas the said core falls onto the soil. The ejection area can be situated at the end opposite to the lower end that penetrates into the soil. However, most often, the ejection area is lateral and directed rearwards with respect to the forward direction of the device, whereas a lateral opening is provided along the narrow spade and the said narrow spade is oriented inside the device accordingly. In a second stage, these cores are collected and disposed of in order to clean the soil, whereby this disposal is particularly significant for golf links where the soil should not exhibit any obstacles or surface irregularities. Once such a device has passed, the soil therefore exhibits a multitude of core holes arranged regularly along the forward axis of the device. In order to 'erase' the core holes that are a source of embrittlement and irregularity, the treatment of the soil must be continued by spreading sand on the surface, whereas the said sand is then swept in order to fill in the holes.

This method exhibits however several shortcomings. As the treatment operations are mechanised, the vehicles used are relatively heavy and as they pass, the running gear may cause deformations of the soil and more particularly after core boring because of its embrittlement. These soil treatment techniques also call for several passes, a first for core boring, a second for collecting the cores and a third for spreading and brushing the sand in order to fill in the core holes. There follows a significant treatment duration during which the terrain cannot be used, not to mention the expensive cost of the treatment.

This invention enables to solve these problems thanks to a means of astonishing simplicity.

SUMMARY OF THE INVENTION

The invention therefore relates to a method for treating the soil by aeration, whereas the device may move in translation and be raised, whereby the device comprise a frame and tools mobile with respect to the said frame, whereas the tools are intended for sampling cores in the soil, whereas the cores are ejected from the tools in an ejection area and stored in the said device.

According to the invention, the device comprises a receiving member integral with the frame and arranged between the soil and the ejection area, comprising through openings for the tools, and exhibiting an upper face and a lower face, whereas the said receiving member contains a flexible carpet resting on the soil by at least a section part of its lower face, whereby the falling cores are stored on the upper face of the carpet.

In various embodiments of the invention, the following means can be used, individually or combined in all the technically possible possibilities, are implemented:

- the receiving member is fixed on the holding down clamp;
- the receiving member is a flexible carpet, whereas the said carpet rests on the soil by at least one part of its lower face;
- the lower face of the carpet comprises elements protruding with respect to the general plane of the lower face, whereby the protruding elements, for example, spikes, chevrons or others, that may be connected, are intended for distributing the sand that might have been spread over the soil;
- the lower face of the carpet comprises at least a series of protruding chevrons, whereas the series of chevrons is aligned along an axis parallel to the forward axis of the device and passing through the axis of the corresponding core boring tool;
- the through opening for the tool comprises at least a chamfered edge and preferably the rear edge according to the forward direction of the device, which enables to do away with the passing of the sand that might have been spread over the soil, toward the upper surface of the said carpet;
- the through opening for the tool comprises at least an elevated edge, which enables to do ay with the passing of the sand that might have been spread over the soil, toward the upper surface of the said carpet;
- the receiving member is a rigid tray;
- the rigid tray is hinged to the frame in order to tip the stored cores when the device is raised;
- a deflecting member is fixed to the frame, the said member is placed at the back of the ejection area of the cores so that the ejected cores are brought back to the receiving member;
- the receiving member comprises at least along both its free lateral edges, rims intended for holding the waste on the receiving member;
- at least a section of the rims intended for holding the waste on the receiving member comprises notches, enabling more particularly in the case of a carpet, to fold or bend the said carpet;
- the rim comprises an L-shaped band, whereas the side in contact with the carpet is substantially flat and the free side is corrugated.

In an embodiment, the receiving member, rigid tray or flexible carpet, is specific to the mobile tools. The layout of the through openings is then suited to the spacing of the tools or the working units. Receiving members corresponding to such or such type of tool should therefore be realised.

Besides, the receiving member is subject to soil friction and hence to wear; it may also be damaged because a tool has broken or deviates or because an obstacle has been encountered.

It is therefore necessary to have an important stock of receiving members, which increases the cost.

In an advantageous embodiment, the receiving member is modular, whereas its diverse constitutive modules are linked together by dismountable joints.

This embodiment may also exhibit the following characteristics, considered individually or in combination:

- the receiving member is divided from front to back according to the forward direction of the device, into at least three sections, corresponding respectively to a front section, an intermediate section and a rear section. whereby the intermediate section corresponds to the area of the through openings for the tools, whereas the three sections are hinged together by dismountable joints;
- the front section is fixed to a front roll;
- the intermediate section is fixed to a holding down clamp;
- the receiving member is a flexible carpet or a rigid tray;
- at least one of the sections of the receiving member is a flexible carpet;
- at least one of the sections of the receiving member is a rigid tray;
- the lower face of the front section is substantially smooth;
- the lower face of the intermediate section comprises bulges or spikes, for example of a height comprised between 2 and 10 mm, preferably in the order of 4 mm;
- the lower face of the rear section comprises chevrons;
- at least one section made of a flexible carpet is made of an elastomer material, in particular a reinforced material, advantageously a reinforced polyurethane material;
- the receiving member is divided into at least two bands hinged together by at least one dismountable joint;
- at least one section is divided into at least two bands hinged together by at least one dismountable joint;
- the dismountable joint is flexible;
- the dismountable joint consists of an elongated member linking rings staggered along the hinged edges of the sections and/or bands;
- the hinged rod is a flexible cable.

The modularity of the device according to the invention may therefore be provided along two axes. A first modularity consists in dividing the receiving member transversally with respect to the forward direction of the device into several sections, for example three sections, hinged together. A second modularity consists in dividing the receiving member perpendicularly to the first modularity to form longitudinal bands hinged together and extending from front to back. Finally, these modularities may be combined, since one or several of the transversal sections forming the receiving member, can be divided into bands:

- the device comprises a safety means preventing the tools from coming down when the carpet is folded under the tools; the carpet can be folded up for example due to the unloading of the stored cores thanks to the lifting of the tools, revere motion and subsequent tipping of the cores;
- the safety means comprises an optical sensor and the carpet exhibits a contrast with respect to the soil, whereas the optical sensor is arranged to detected the presence of the carpet under the tools;
- the carpet is coloured and the optical sensor exhibits a wavelength filter centred on the colour of the carpet;
- the device comprises a first means enabling at least to unfold the carpet substantially flat on the soil; the first means is useful to spread or unfold the carpet after unloading the stored cores, which operation causes the carpet to fold up;
- the first means comprises at least a cable linked to the end of a shaft integral with the frame of the device, whereas the said cable is also fixed toward the rear end of the carpet;
- the cable can be lengthened or shortened by a control, whereas the said control can be mechanical, hydraulic, electrical;
- the shaft is mobile in rotation around an interconnection point of the shaft on the said frame, whereby the said rotation is provided by a control, whereas the said control can be mechanical, hydraulic, electrical;
- the cable is fixed and the shaft is mobile in rotation;
- the cable can be elongated or shortened and the shaft is fixed;
- the cable can be elongated or shortened and the shaft is mobile in rotation;
- the shaft of the first means can be elongated or shortened;
- the first means enables moreover to raise the carpet so that the latter does not rest on the soil any longer when the tools are raised and the soil treatment operations are finished; raising the carpet enables the device to move freely over roads or others without the carpet slipping on the soil;
- the device comprises a means for unfolding and/or raising the carpet.

The invention also comprises a method for implementing a device for treating the soils by aeration, consisting in sampling cores in the soil using tools and in storing them in the device according to the previous characteristics and comprising a flexible carpet. The invention suggests to store the cores ejected from the tools and falling on the upper face of the flexible carpet and also to leave the carpet rest on the soil by at least one section of its lower face.

Soil can be sanded previously to core boring. The word 'previously' means that the sanding operation takes place from a previous pass of a vehicle or that the sanding takes place ahead of the core boring with the same vehicle that performs this core boring. Thus the soil treatment can be provided in two or in a single pass. In a preferred embodiment, sanding takes place previously to core boring.

According to an advantageous embodiment sweeping or brushing, both words being synonymous, takes place at the rear of the receiving member, for example using a brush located at the rear of the device.

Thanks to this invention, while enabling to store cores, the operator does not need to come back and collect the cores on the soil as it is the case in the conventional technique. The invention also enables to improve the efficiency of the soil treatment methods by modifying various steps of the method. Using a flexible carpet is particularly interesting since the carpet can follow the irregularities of the terrain and thus enables better distribution of the sand in the core holes in case when sanding takes place previously, i.e. before or ahead of the core boring. The flexibility of the carpet enables better distribution of the cores that are stored on the upper face of the carpet since the deformations of the carpet when it slips on the soil, prevent the accumulation of too significant limited batches. The flexibility of the carpet can be provided by various means: either the use of a flexible material in itself or, possibly in combination, by a particular arrangement of a rigid material and for example metal parts hinged together, metal lattice, metal coat of mail, . . . The coat of mail is contemplated since sand and/or other small-sized elements that would be passed over the upper face of the carpet may then pass over the soil again through the carpet.

Finally, the invention also relates to a method for treating the soils by aeration in which cores are sampled from the soil by a core boring device and stored in the said device and according to which soil sanding takes place previously to core boring.

BRIEF DESCRIPTION OF THE DRAWINGS

This invention will be illustrated better without being limited whatsoever by the following description, with reference to the appended drawings on which.

DETAILED DESCRIPTION OF THE INVENTION

Figure 1:
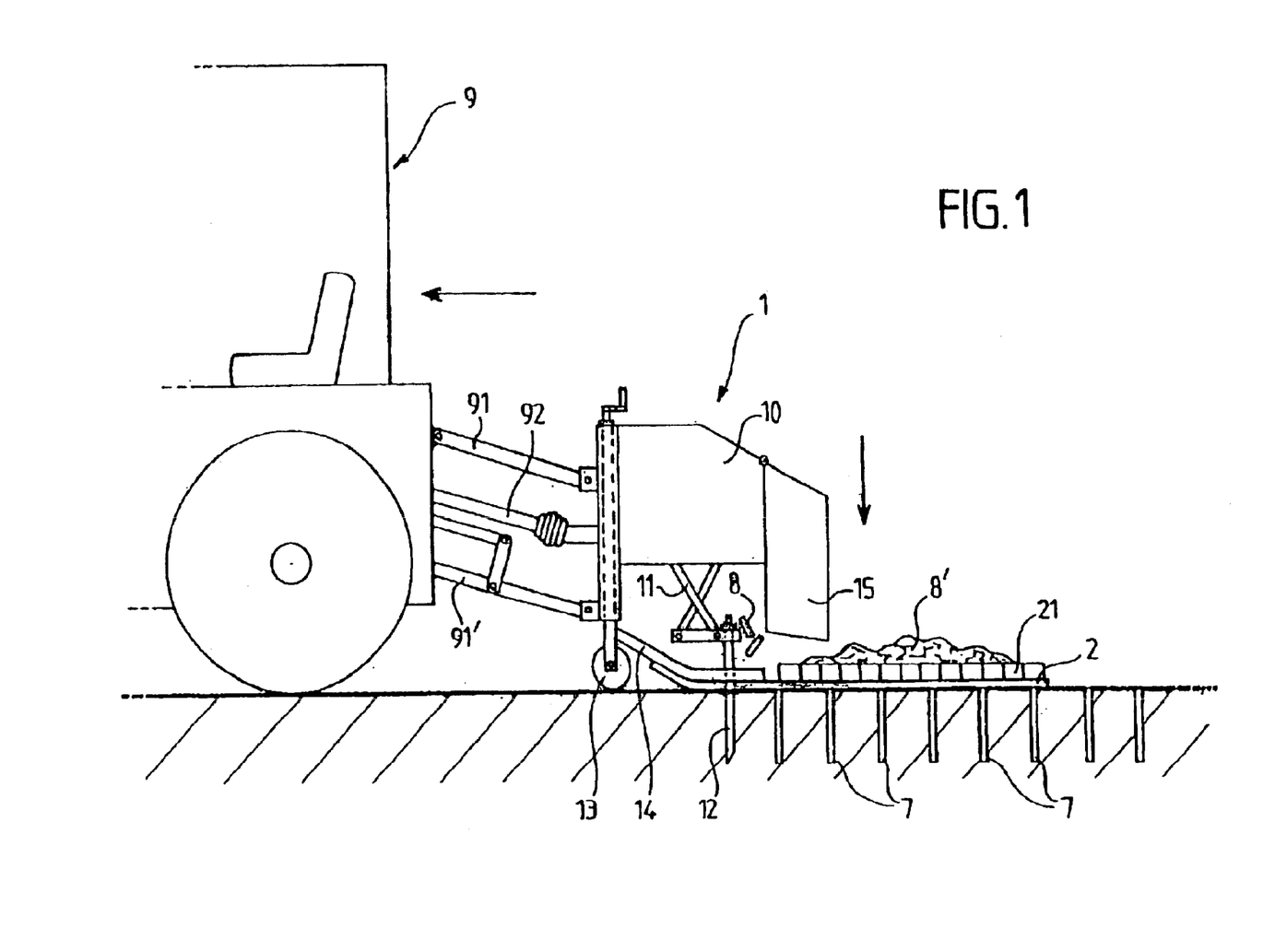
FIG. 1 represents the carpet device as a side view in operating phase.

On FIG. 1, a device 1 according to an embodiment of the invention comprising a flexible carpet 2 is towed by a tractor 9. The carpet can be made of any resistant and flexible material and preferably of synthetic material, reinforced or not. The device moves forward over a herbaceous soil, for example a sporting ground. A chassis 10 covers and carries the actuating means of the mobile tools 11 carrying the hollow narrow spades 12 intended for performing soil core boring. Linking is made by linking rods 91, 91' and the mechanical energy is transmitted to the tractor 9 to the actuating means via a power take-off shaft 92.

Figure 4:
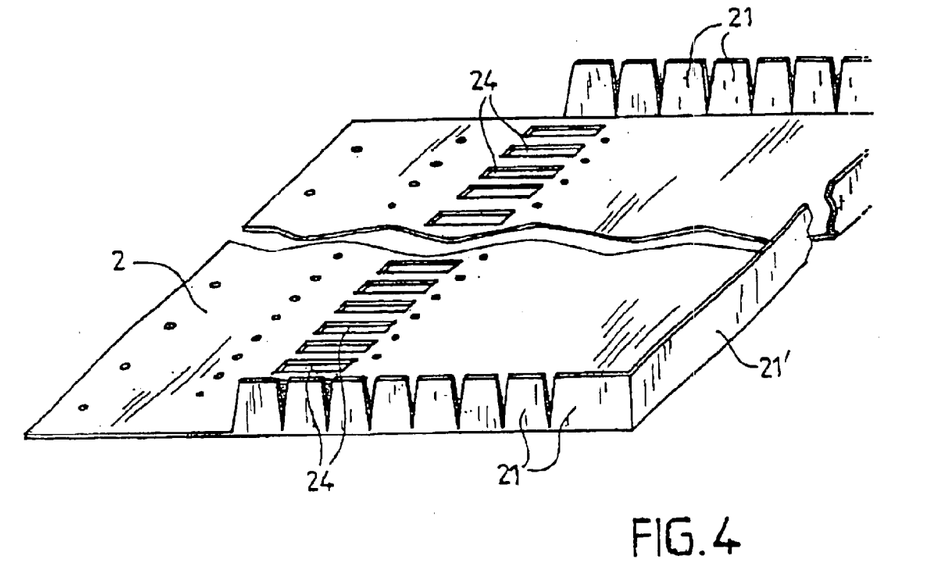
FIG. 4 represents a perspective of the upper face of a carpet.

On FIG. 1, the device is in operating mode, where the frame 10 is lowered and the roll 13 is resting on the soil. The roll 13 may be provided on a pin with adjustable height in order to adjust the height of the frame 10 in relation to the soil and hence the core depth. In a preferred embodiment, the carpet 2 is fixed to the frame 10 on the holding down clamp 14. The carpet is fixed to the lower face of the holding down clamp and in the most usual operating mode, the carpet is applied to the soil on the larger section or the whole of its lower surface since generally, and in the absence of a carpet, the holding down clamp 14 slips on the soil. A single hollow narrow spade 12 is represented for reasons of simplification. The narrow spade 12 is here inserted into the soil. At right angle to each narrow spade, the receiving member comprises through openings 24 for narrow spades. As the narrow spades are hollow, core boring can be made on a regular basis. The core 8 from a previous core boring is ejected during the following core boring. As the device progresses, with the tractor 9 in forward gear, core holes 7 are performed regularly. The cores 8 ejected from the hollow narrow spades are stored 8' on the receiving member or carpet 2. At least two lateral rims 21 are provided along both free edges of the receiving member in order to hold the cores 8 stored 8' on the said member and prevent them from escaping from the said and 'soiling' the soil. In a preferred embodiment and in the case of a carpet, the substantially rigid rims comprise notches or cut-outs or any other means enabling the carpet to modify its shape according to the surface of the soil, while allowing for retention of the cores 8 stored 8'. These notches or cutouts may form elements with overlapping edges, enabling to maintain continuous retention during folding operations or not. These means with notches are also intended for enabling the carpet to bend and fold during the unloading phase. The rear edge of the receiving member may also comprise a rim 21' (FIG. 4).

The cores 8 can be ejected with certain energy, whereas a deflector 15 is provided at least at the rear of the ejection area in order to drop the cores 8 on the receiving member. The deflector may be a rigid or flexible element and is fixed to the frame 10; it may extend laterally as represented on FIG. 1.

Figure 2:
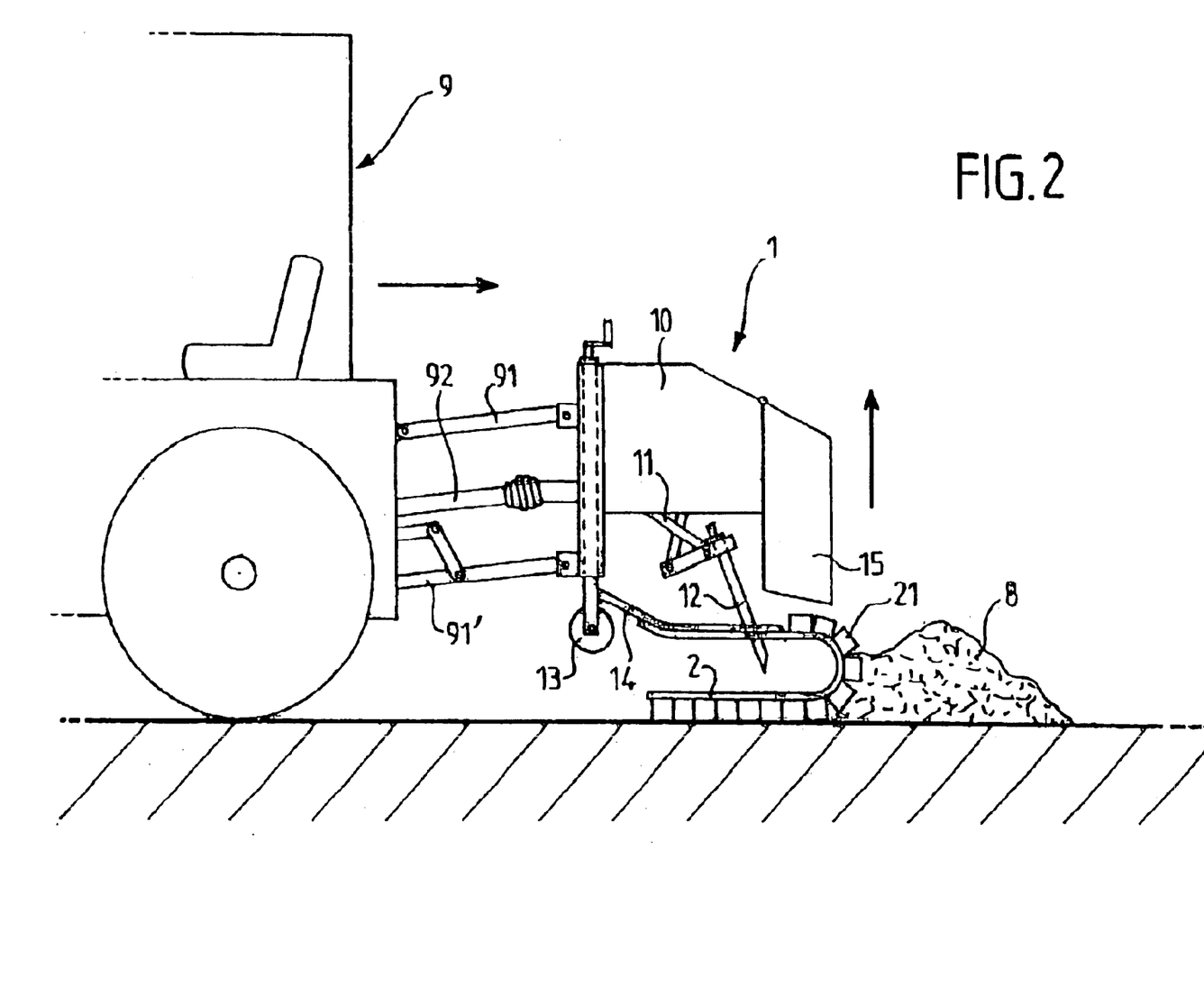
FIG. 2 represents the carpet device as a side view in unloading phase.

On FIG. 2 the device 1 of FIG. 1 is represented in its unloading phase, in which the frame 10 is in raised position and the tractor in reverse gear. Thanks to the flexibility of the carpet 2 and to notches or others of the lateral rims 21, the carpet folds up and tips the cores 8 onto the soil.

Figure 3:
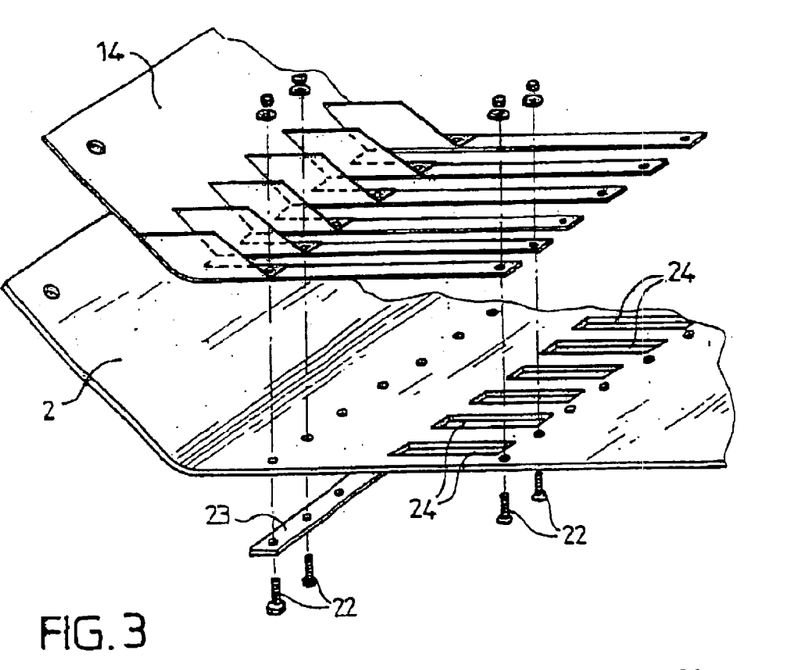
FIG. 3 represents an exploded perspective view of the assembly of a carpet on the holding down clamp.

FIG. 3 illustrates how the carpet 2 is attached to the holding down clamp 14. The carpet 2 comprises through openings 24 for the narrow spades at right angle thereto. Any type of attachment may be used, for example bolting one (or several) holding down plate 23 on the holding down clamp at least ahead of the area of the openings 24 and behind that area.

FIG. 4 represents the carpet 2 seen from above in perspective in order to visualiise the series of through openings 24 for the narrow spades and the rims 21 and possibly 21'.

Figure 5:
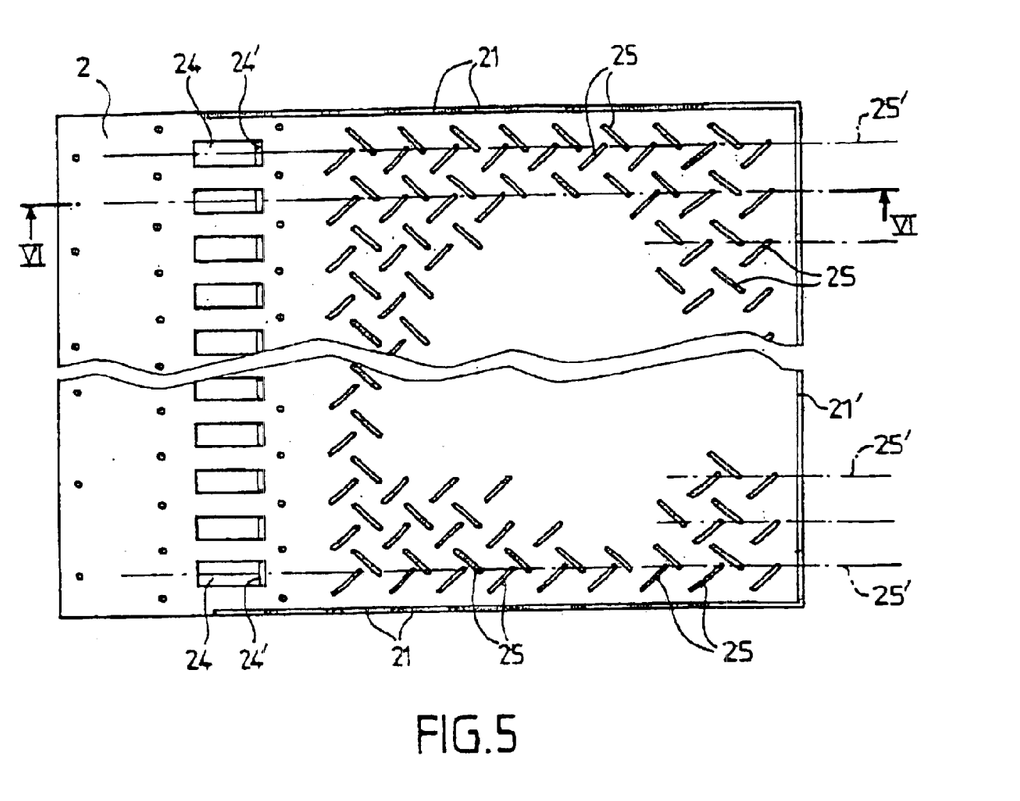
FIG. 5 represents the lower face of a carpet.

FIG. 5 shows the characteristics of the lower surface of the carpet 2 essentially in contact with the soil. Series of chevrons 25 are regularly arranged on that lower surface. The chevrons are protruding with respect to the general surface of the carpet 2 and are intended for guiding the sand that might have been spread previously on the soil before core boring, towards the core holes 7 in order to fill them up. In this view and in this particular embodiment, the series of chevrons 25 are provided along axes 25' passing through the openings 24 and therefore the axis of the corresponding narrow spade. It is however possible in other embodiments to provide protruding elements on the lower face of the device, carpet or rigid tray, of another type and for example spikes, toes, triangular, rectangular shapes . . . in all their possible orientations enabling spreading and/or guiding of the sand. Several types of elements can be associated and for example spikes arranged ahead of the chevrons according to the operational forward direction of the device.

Figure 6:
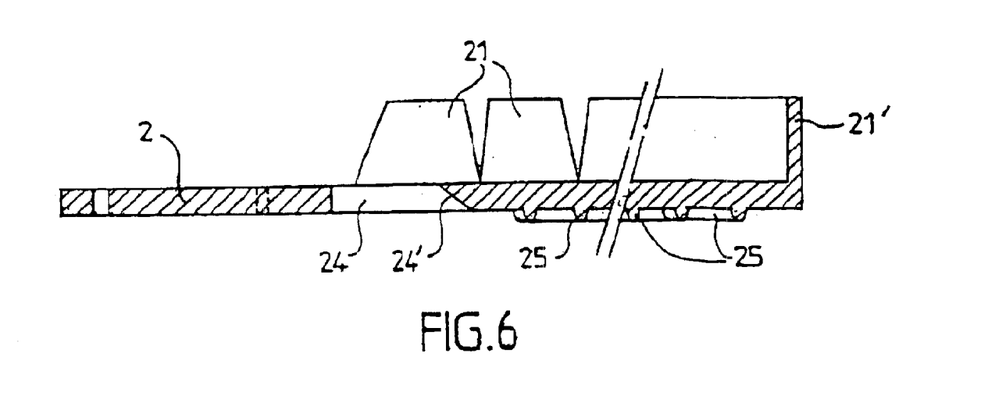
FIG. 6 represents a cross-sectional view of a carpet at the level of a through opening.

FIG. 6 shows the chamfered edge 24', provided in the through opening 24 in order to prevent the sand that might have been spread on the soil to migrate toward the upper surface of the carpet, as a cross-sectional view along an axis 25'. That same figure shows one of the rims 21 and the chevrons are seen on diverse planes.

Figure 7:
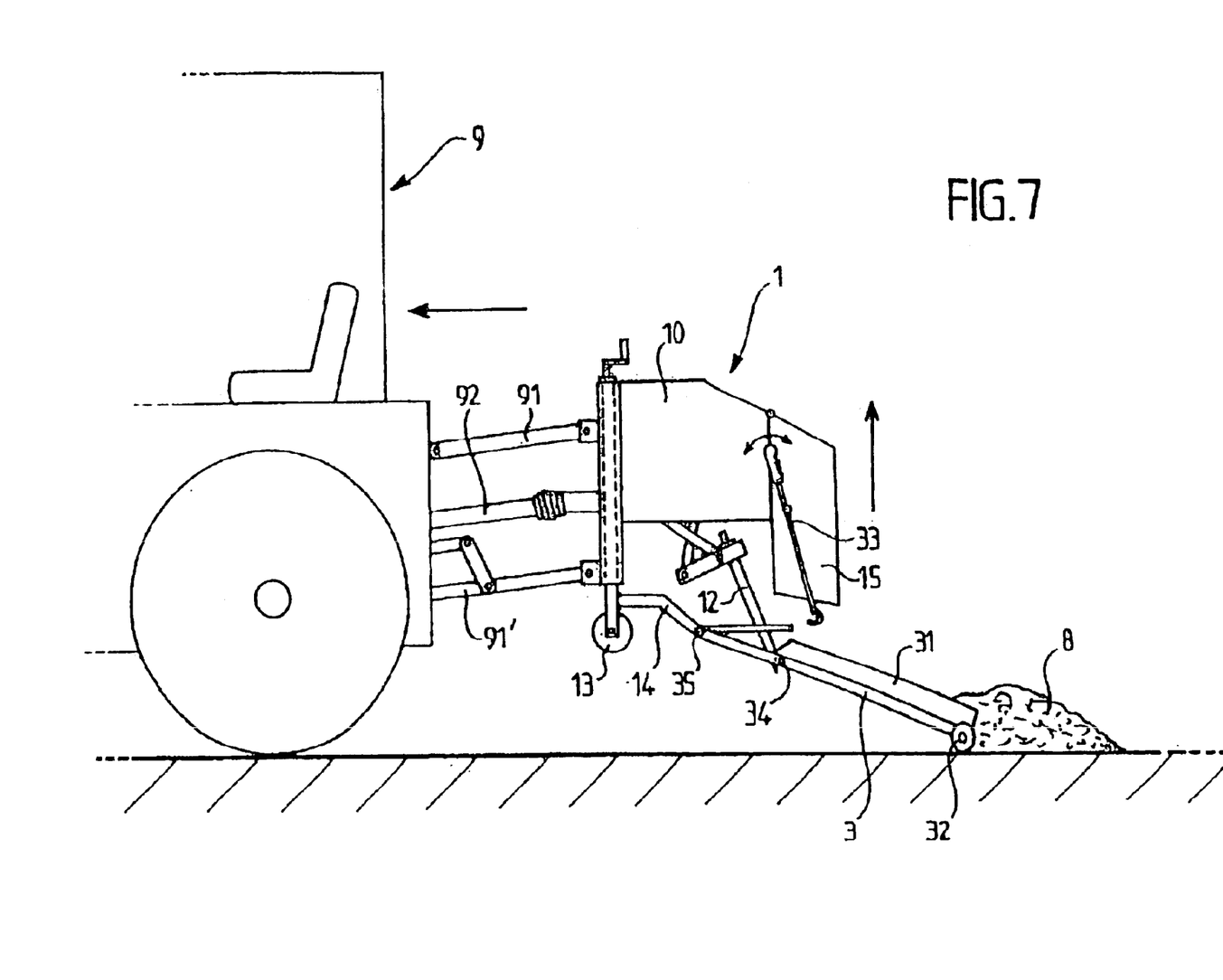
FIG. 7 represents the device with a rigid receiving member as a side view in unloading phase.

FIG. 7 represents a particular embodiment where the receiving member consists of a rigid tray 3 attached to the frame 10. The tray 3 is arranged at such a height that it is situated between the soil, on which it may possibly rest directly and slip or indirectly by a running gear, and the ejection area of the cores 8. In a preferred embodiment, a joint 35 enables tipping and disposing of the cores stored on the tray when the device is raised and the tray is released. This joint can be placed in any position enabling to store the cores during the treatment and to tip the said. On the figure, the joint 35 is provided on the holding down clamp 14, however it is contemplated within the framework of the invention that the tray and the holding down clamp become a single part. It is also considered that the joint, instead of being ahead of the tools, is placed laterally, whereas the emptying is then performed sideways instead of rearwards. At least two rigid rims 31 are arranged along the lateral rims of the tray 3. A running means 32 is preferably arranged towards the end of the tray. A retaining means enabling to release the tray for unloading consists, for exemplification purposes of a retaining toe 34 and a releasing lever 33. Any other control means of the tray 3 is contemplated within the framework of the invention, passive, with or without a spring-loaded elastic recall device or other, or active with a hydro-pneumatic, pneumatic, electrical control or other.

Figure 8:
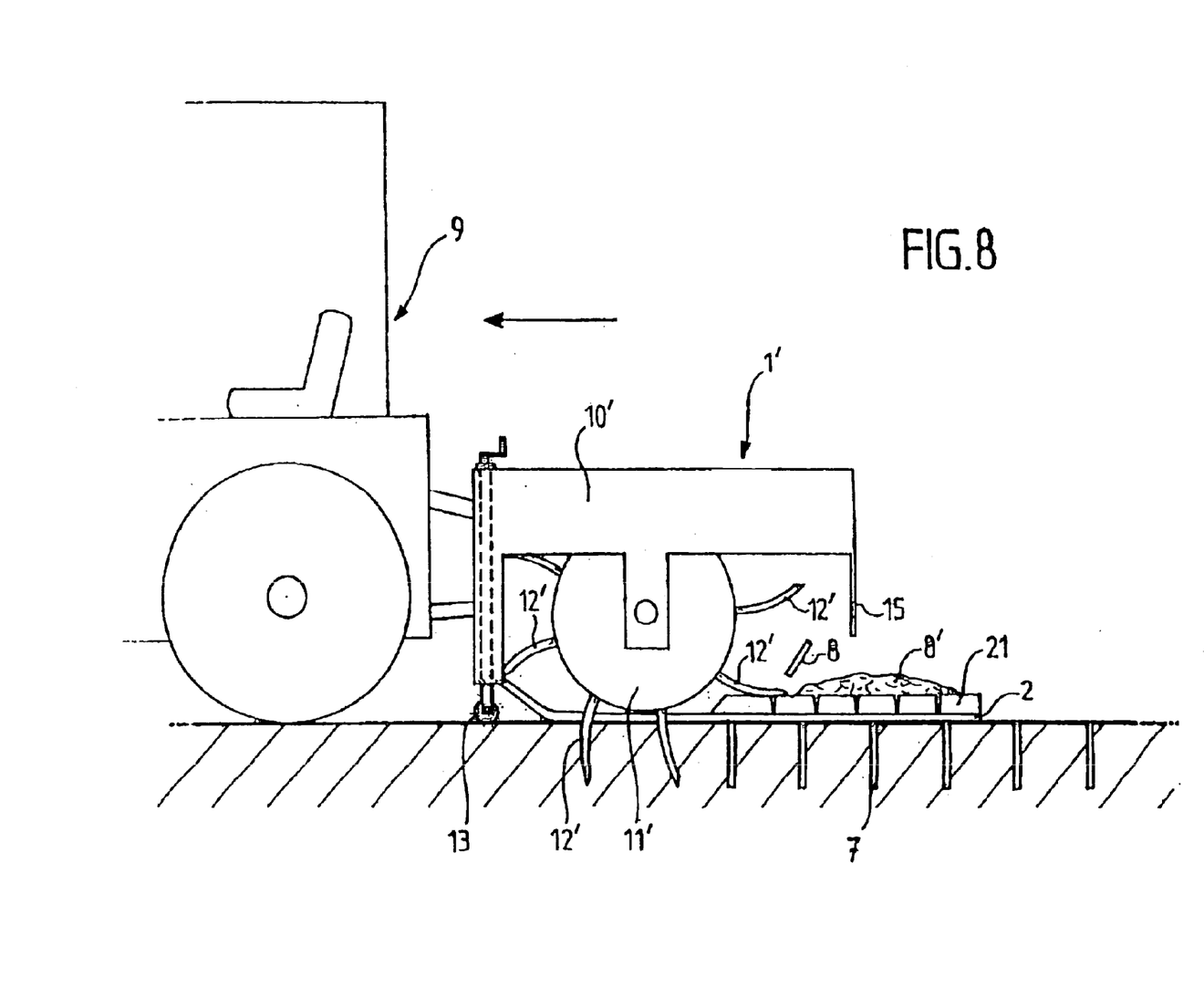
FIG. 8 represents a roll or disc treatment device.

This invention can also be used with aeration devices comprising hollow narrow spades carried by a cylinder or by a series of parallel discs mounted on a towed frame or an automotive frame as represented diagrammatically on FIG. 8. A device 1' of the roll-type 11' on which a ballasted roll or a roll applied under pressure on the soil by active means, comprises on its surface hollow narrow spades 12' that are bent, The receiving member 2 is fixed to the frame 10'. The through openings are of sufficient length not to be an obstacle to the rotation of the narrow spades 12'. In that type of device, the displacement of the frame suffices to perform the core boring.

Figure 9:
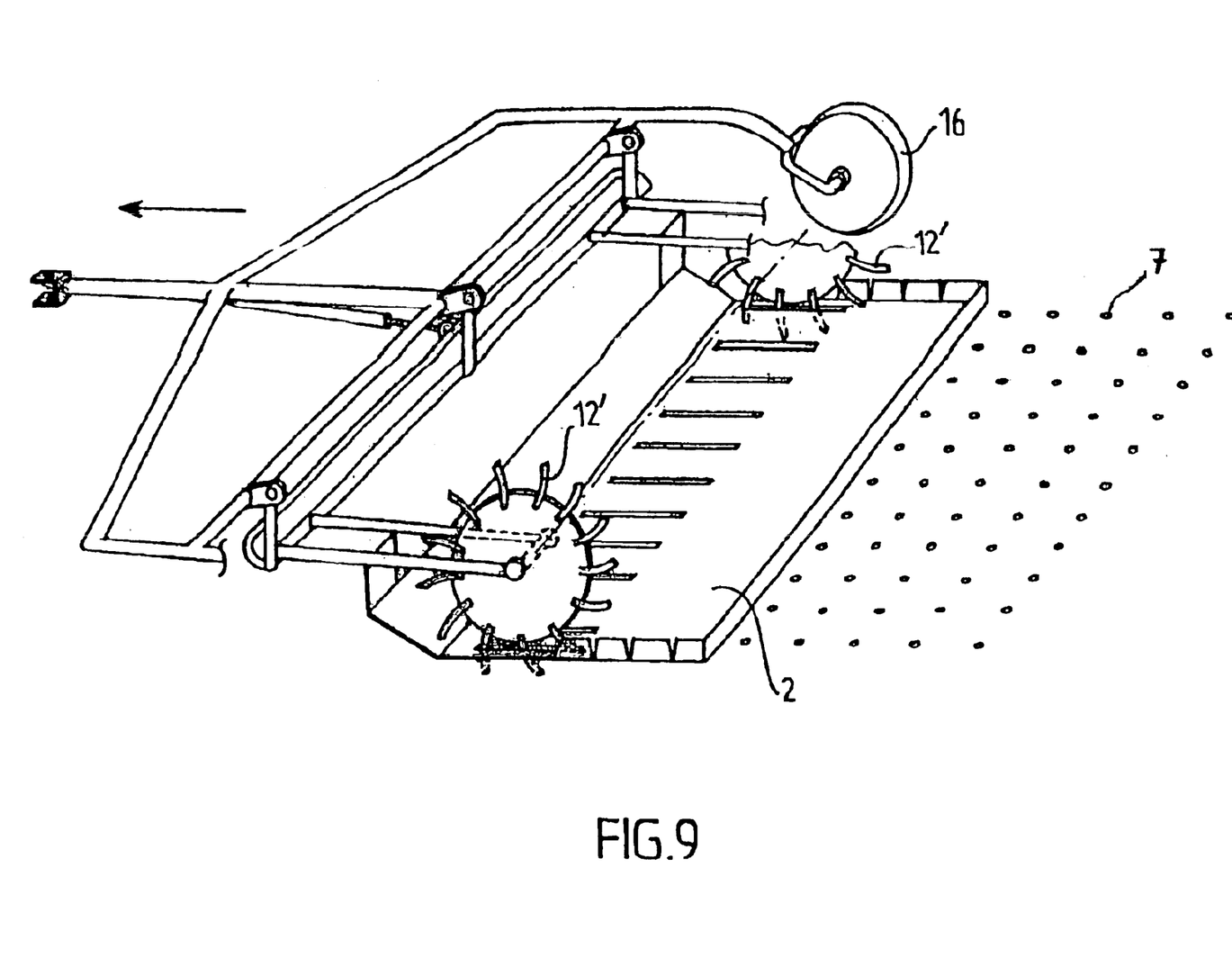
FIG. 9 represents a disc treatment device.

FIG. 9 represents an exploded view of another disc-type device carrying hollow narrow spades. A section of the discs is not represented for better visualisation of the carpet. Only the wheel on the background 16 is shown, whereas the symmetrical wheel at the front has not been represented.

Figure 10:
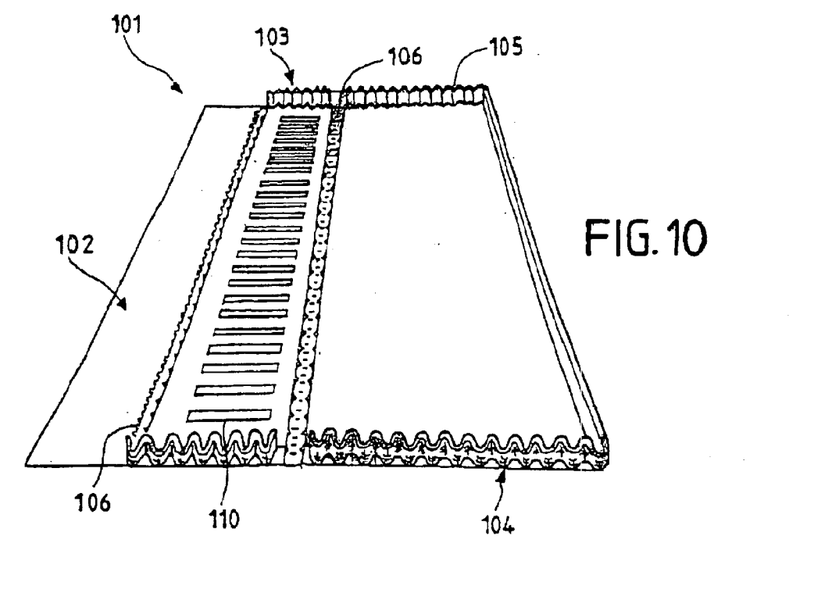
FIG. 10 is a perspective representation of a receiving member in several transversal sections.

FIG. 10 illustrates a first modularity mode of the receiving member of the device. The receiving member 101 is divided transversally with respect to the displacement direction of the direction, into three sections, a first so-called front section, a second so-called intermediate section 103 and a third so-called rear section 104. The front section 102 is linked to the intermediate section 103 via a dismountable joint 106. The intermediate section 103 is linked to the rear section 104 by another dismountable joint 106. The front section 102 is intended for attachment to the chassis or, preferably on the members linked to the roll provided ahead of the core tools. The front section 102 can be a flexible carpet or a rigid tray.

The intermediate section 103 is drilled with through openings 110 for the core tools. The intermediate section 103 can be attached to holding down clamps, but it can also be left clear in order to hug the soil. The intermediate section 103 is preferably a flexible carpet of reinforced synthetic material and for example of the type implemented in conveyor belts. The intermediate section may comprise protruding elements on its lower face and in a preferred embodiment spikes of 2 mm to 10 mm in height, preferably approx. 4 mm in height.

The rear section 104 is preferably a flexible carpet surrounded by a rim 21, 21', 105 intended for maintaining the cores stored on the receiving member. In the case of a carpet, the rim 21, 21', 105 is a flexible device enabling folding the carpet up when tipping the stock of cores when reversing the device. In a preferred embodiment, the rim is a profiled band of relatively flexible and L-shaped synthetic material whose free side is undulated and the side in contact with the carpet is substantially flat in order to be glued, riveted or attached by any other means thereto. The undulation of the clear side ensures the necessary flexibility enabling to fold the carpet. Within the framework of the invention, it is contemplated that the rim 105 extends substantially along the receiving member and for instance to the front along the edges of the intermediate section 103 or even more to the front along the front section 102.

The rear section 104, preferably made of reinforced polyurethane, comprises at its lower face protruding elements and preferably chevrons.

As the three sections 102, 103, 104 are independent and connected together by dismountable, preferably flexible, joints in the case of a carpet, it suffices to use the specific intermediate band 103 of the tools implemented in the device. Besides, a particularly resistant material and/or a material comprising chevrons and hence relatively expensive can be used for the rear section only, since the other sections are made with more conventional and therefore cheaper materials.

Figure 11:
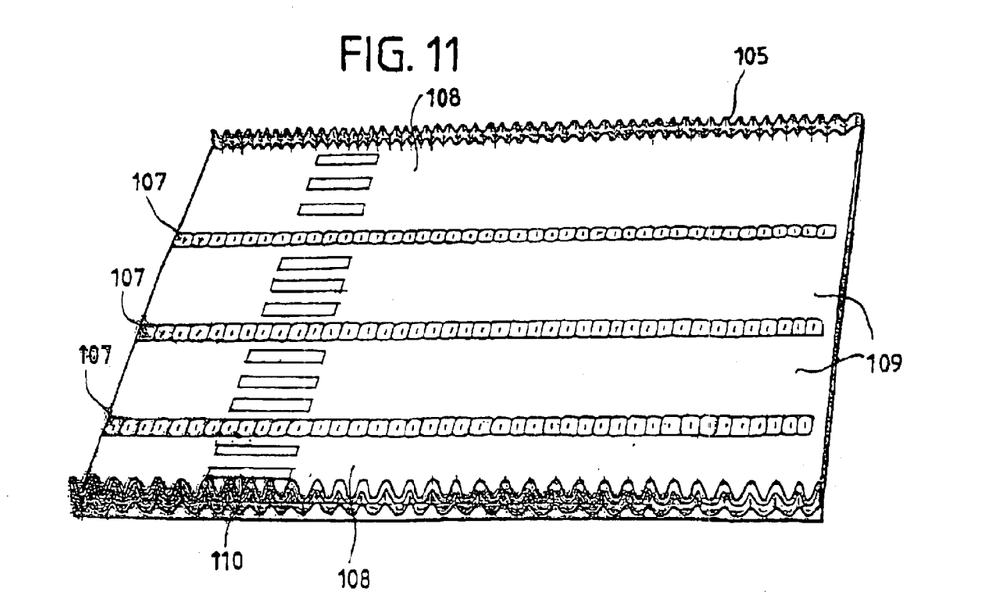
FIG. 11 is a perspective representation of a receiving member with longitudinal bands.

FIG. 11 illustrates a second modularity mode of the receiving member of the device. The receiving member 101 is divided into four longitudinal bands, two lateral bands 108 on the sides and two middle bands 109. In other embodiments, the number of bands may be different. Dismountable joints 107 connect the different bands. In the case of a carpet, the joints are preferably flexible.

Figure 12:
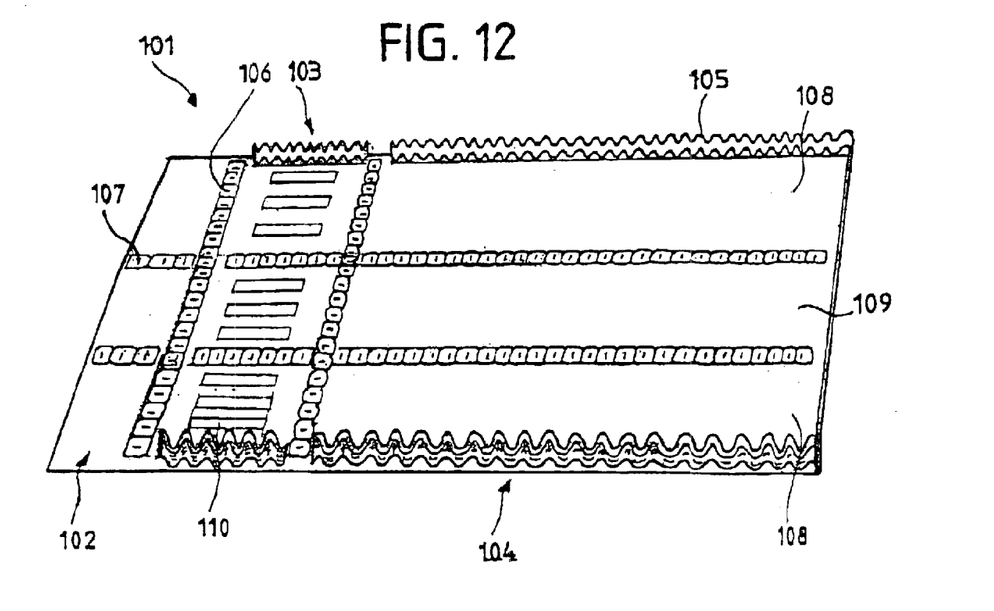
FIG. 12 is a perspective representation of a receiving member with transversal sections and longitudinal bands.

FIG. 12 illustrates a third modularity mode of the receiving member of the device resulting from a combination of both previous modes. The receiving member 101 is divided simultaneously into three transversal sections and into longitudinal bands. In other embodiments, only a section can be divided into bands, for example the rear section. As the rear section is made of a particularly resistant material and/or a material comprising chevrons, it is preferable in case of tear, wear or other problem, to replace only a minimum surface of the receiving member.

In an embodiment, the front section 102 will not be divided into bands, since they are little subject to wear and/or they may be made of a resistant material.

Figure 13:
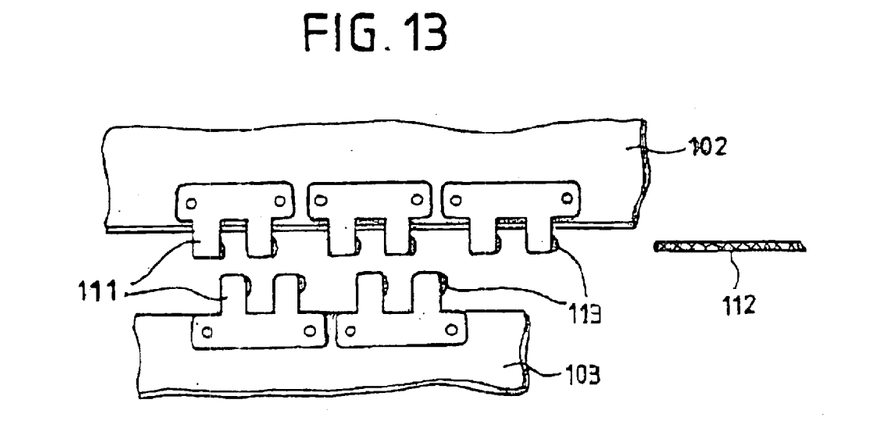
FIG. 13 details a type of joint for linking the sections and/or bands of the receiving member of FIGS. 10 to 12.

FIG. 13 details a type of dismountable and flexible joint that can be used more particularly for a carpet. This joint consists of links arranged and riveted, screwed or other, to the rim of the sections and/or bands to be assembled. For the assembly, the opposite links are staggered, whereas their rings 113 are placed along a single axis along which an elongated element such as cable 112 has been inserted. Both ends of the cable comprise means enabling to block the cable so that it cannot slip out of the rings during the treatment of the soil. As the different links are independent elements attached to the carpet and a flexible cable is used, the dismountable joint is flexible and the carpet may adapt to the irregularities of the ground.

Figure 14:
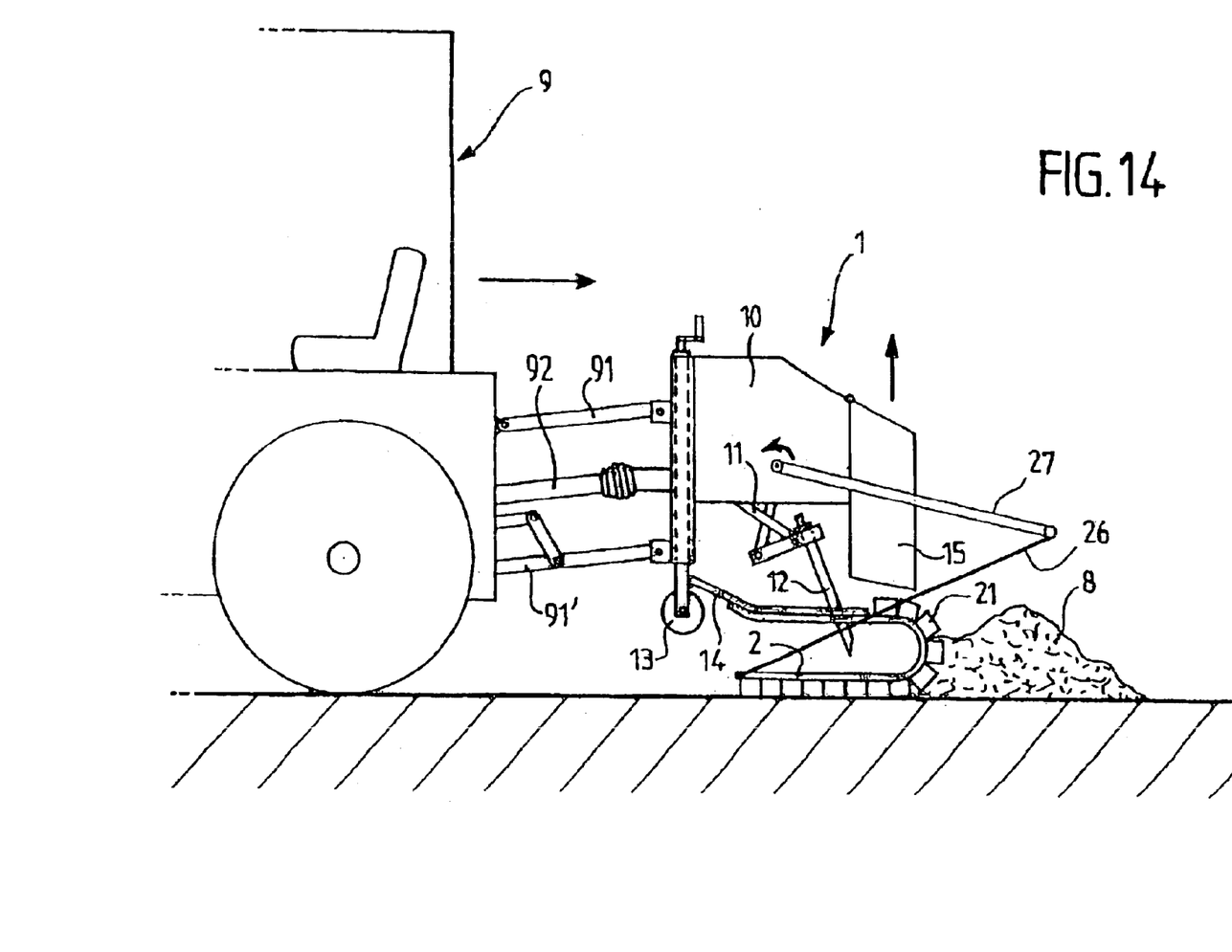
FIG. 14 represents a device comprising means for unfolding and/or raising the carpet.

FIG. 14 enables to visualise a device comprising means for unfolding and/or raising the carpet. On that figure, the device is unloading the cores, whereas the device has been raised and moved backwards. The carpet is therefore unfolded and a section of the former is therefore situated under the core boring tools. It appears therefore that if the operator lowers the device at that time, the carpet may be damaged by the tools.

In a first embodiment not represented, it is therefore contemplated to employ a sensor informing the user and/or preventing the device from falling when the carpet is folded under the tools. The sensor is preferably an optical sensor arrangement substantially in the area of the tools and oriented downward. In order to facilitate the detection, the carpet is made of a material of natural colour or in black or coloured so that it exhibits a very important contrast with the soil. For example, the carpet may receive a coat of red or yellow fluorescent paint that jars against a conventional herbaceous soil. The sensor may comprise a filter centred on the colour of the carpet to be detected.

In another embodiment, active means are available to spread the carpet at least. These means are at least a cable 26 and a shaft 27 integral with the frame. The cable that is attached to the rear end of the carpet 2 is also integral with the rear end of the shaft by a fixed attachment in case when the cable is of constant length or by a sliding or winding means, for example a gear or a pulley, in case when the cable length between the point of attachment to the carpet and the end of the shaft can be shortened or elongated by a control. The shaft 27 can also be fixed or mobile in rotation in order to enable spreading as well as lifting the carpet. It is also contemplated that the shaft may be lengthened. This shaft can also be common with a sweeping device towed with the device and arranged on the rear section of the carpet. The shaft 27 can be single, for example a fork integral on both sides with the frame or a single shaft integral in a middle point with the frame or, still, implemented in pair. In a preferred embodiment, two shafts 27 arranged laterally are implemented and two cables are attached towards both rear and lateral ends of the carpet as represented on FIG. 14.

The device as it has just been described can involve a flexible carpet for each of the three sections. It is also contemplated without departing from the framework of the invention that one or several of the sections are rigid, whereas the receiving member is totally a rigid tray or a combination of rigid and flexible members. For example, the front and intermediate sections are rigid and the rear section flexible or, still, the front section is rigid and the intermediate and rear sections are flexible.

For exemplification purposes of materials useable for the realisation of a flexible carpet, one may quote the bands NNT 20 ECDV, NAK 12 EHDV, FAF 12 E of the company HABASIT France S. A., hinged by 'alligator' staples, whereas the corrugated rims intended for containing the cores are made of rubber and approx. 80 mm in height.

This invention can be used according to diverse treatment methods for herbaceous soils consisting in performing aeration, then in spreading sand and in distributing the said so that it fills in the core holes. This invention is also useable according to a method in which aeration, collection and disposal of the cores are performed simultaneously during a single pass. Finally, this invention can also be used according to a new method in which aeration, collection, disposal of the cores and filling the core holes with sand are carried out simultaneously during a single pass. The invention makes the sanding operation possible before core boring and collection, thereby limiting to two, possibly one, the number of passes of the vehicles. The sanding at the front can be performed by any means. Generally, sand is spread over a substantially uniform thickness. However in other embodiments, sand spreading can be made via ducts connected to a sand tank and opening up substantially ahead of the hollow narrow spades, for instance after the fashion of the sanding vehicles used on railways. In a preferred embodiment, the ducts open up slightly sideways with respect to the narrow spades so that core boring is carried out in a non-sanded area thereby reducing the wear and the consumption of sand. It is also possible to sand just behind the narrow spades, whereby the ducts then go through the carpet or the tray. The presence of the chevrons guiding the sand downstream towards the holes also enables substantial sand savings. It is also possible to use at the rear of the storage device of the invention a conventional brush for distributing the sand.

In a preferred embodiment of the soil treatment method using the device, sanding takes place during a first pass before core boring. Thus in two passes, it is possible to treat the soil, contrary to the conventional techniques where at least three passes were necessary to aerate, then to collect the cores and finally to spread and to distribute the sand. As the number of passes is reduced, the deformations of the soil under the effect of the vehicles are thereby reduced.

This invention can thus be used according to diverse methods for treating herbaceous soils and, for example, according to a method in which aeration, collection, disposal of the cores and filling the core holes with sand are performed simultaneously during a single pass, whereas a brush is provided at the rear of the device for sweeping the sand.

The embodiments and implementation examples of the invention that have just been described are purely informative and may not limit the extent thereof in any way.

What is claimed is:

1. A device for treating soil by aeration, whereby the device may move transversely and be raised, the device comprising:

a frame and tools mobile with respect to said frame;

the tools being structured and arranged to sample cores in the soil;

the cores being ejected from the tools in an ejection area, and stored in said device;

a receiving member integral with the frame and arranged between the soil and the ejection area;

said receiving member comprising a flexible carpet having through openings for the tools, an upper face, and a lower face; and said flexible carpet resting on the soil by at least one section of its lower face, whereby falling cores are stored on the upper face of the carpet.

2. The device according to claim 1, wherein the receiving member is attached to a holding down clamp.

3. The device according to claim 1, wherein the lower face of the carpet comprises protruding elements with respect to the general plane of the lower face.

4. The device according to claim 3, wherein the lower face of the carpet comprises at least a series of protruding chevrons aligned along an axis parallel to the forward axis of the device and going through the axis of a corresponding core tool.

5. The device according to claim 1, wherein each of the through openings comprises at least one chamfered edge.

6. The device according to claim 1, wherein each of the through openings has a rear rim according to the forward direction of the device, said rear rim being chamfered.

7. The device according to claim 1, further comprising a deflecting member fixed to the frame, at the rear of the ejection area so that the ejected cores are thrown back onto the receiving member.

8. The device according to claim 1, wherein the receiving member comprises at least along both its free lateral edges rims intended for maintaining waste on the receiving member.

9. The device according to claim 8, wherein at least a section of the rims intended for maintaining the waste on the receiving member comprises notches.

10. The device according to claim 8, wherein the rim comprises an L-shaped band having a free side and a side in contact with the carpet, the side in contact with the carpet being substantially flat and the free side being corrugated.

11. The device according to claim 1, wherein the receiving member is modular with at least two modules connected together by dismountable joints.

12. The device according to claim 11, wherein the receiving member is divided transversely in several sections with respect to the forward direction of the device, the sections being hinged together by dismountable joints.

13. The device according to claim 11, wherein the receiving member is divided into at least three sections corresponding respectively to a front section, an intermediate section and a rear section, whereby the intermediate section corresponds to the area of the through openings for the tools.

14. The device according to claim 13, wherein the lower face of the intermediate section comprises bulges or spikes between 2 and 10 mm in height.

15. The device according to claim 14, wherein the bulges or spikes are in the order of 4 mm in height.

16. The device according to claim 13, wherein the lower face of the rear section comprises chevrons.

17. The device according to claim 11, wherein the dismountable joints comprise an elongated member linking rings that are staggered along the hinged edges of the modules, whereby the elongated member is a flexible cable.

18. The device according to claim 1, wherein the flexible carpet is made of an elastomer reinforced material.

19. The device according to claim 1, wherein the flexible carpet is made of a reinforced polyurethane material.

20. The device according to claim 1, wherein the receiving member is divided to form longitudinal bands, extending from front to back; said bands being hinged together by at least one dismountable joint.

21. The device according to claim 1, further comprising means for unfolding or raising the carpet.

22. Method for implementing the device according to claim 1 for treating soil by aeration, which comprises sampling cores from the soil with tools, then storing the cores in the device comprising the flexible carpet, wherein the cores ejected from the tools and falling onto the upper face of the flexible carpet are stored, and the carpet rests on the soil by said at least one section of its lower face.

23. The method according to claim 22, wherein soil sanding is made previously to core boring.

24. The method according to claim 23, wherein sweeping or brushing takes place at the rear of the receiving member.

* * * * *